United States Patent

[11] 3,556,221

| [72] | Inventors | Gerald W. Haws<br>Denver;<br>Joseph L. Rael, Littleton; John S. Rhudy,<br>Denver, Colo. |
|------|-----------|---|
| [21] | Appl. No. | 789,355 |
| [22] | Filed | Jan. 6, 1969 |
| [45] | Patented | Jan. 19, 1971 |
| [73] | Assignee | Marathon Oil Company<br>Findlay, Ohio<br>a corporation of Ohio |

[54] WELL STIMULATION PROCESS
7 Claims, No Drawings

| [52] | U.S. Cl. | 166/305 |
|------|----------|---------|
| [51] | Int. Cl. | E21b 43/25 |
| [50] | Field of Search | 166/305, 307, 311, 312; 252/8.55C |

[56] References Cited
UNITED STATES PATENTS

| 3,122,503 | 2/1964 | Katzer | 166/312X |
| 3,249,536 | 5/1966 | Jones | 166/300 |
| 3,372,748 | 3/1968 | Cook | 166/246 |
| 3,482,635 | 12/1969 | Pasini III | 166/305 |
| 3,482,636 | 12/1969 | Crowe | 166/307 |

*Primary Examiner*—Stephen J. Novosad
*Attorneys*—Joseph C. Herring, Richard C. Willson and Jack L. Hummel

ABSTRACT: Reduced permeabilities in the vicinity of a well bore caused by polymer solution deposits are improved by introducing into the well bore an aqueous solution having a pH greater than about 8 and containing sodium hypochlorite.

WELL STIMULATION PROCESS

BACKGROUND OF THE INVENTION

This invention relates to a method of stimulating oil wells. More particularly, this invention relates to a method of improving flow characteristics of wells which have become plugged in the vicinity of the well bore with a polymer solution.

Formation damage or skin damage in the area surrounding a well bore may be caused by the invasion of foreign fluids and/or solids in this area. Oftentimes, these foreign particles are introduced as components in the drilling mud. The resulting formation is often subjected to such things as clay swelling, emulsification, or precipitation of solids, e.g., ferric hydroxide, causing size reduction or plugging of internal pores by intruding solids. Various methods have been employed to reduce or eliminate this formation damage and increase the permeability of the formation adjacent the well bore so that further hydrocarbons may be recovered from the formation. Three well-known methods are nitroshooting, hydraulic fracturing, and acidizing.

The increased use recently of polymer solutions in drilling muds and secondary waterflooding operations, as well as tertiary floods, has presented a need for a method which will effectively reduce plugging in the vicinity of a well bore. These applications of the polymer solutions cause deposits of the polymer in the sand rock, e.g. by absorption, thus reducing the relative permeability to the flow of water.

SUMMARY OF THE INVENTION

Applicants have found that polymer plugging can be substantially reduced by injecting into the formation adjacent the well bore an aqueous solution having a pH of at least about 8 and containing a compound or mixture of compounds of the formula MOX wherein M is an alkali metal or ammonium and X is a halogen. The term "plugging" as used herein means having a substantially reduced permeability.

DESCRIPTION OF THE PREFERRED EMBODIMENTS

Polymers which may cause plugging of the formation around a well bore generally have a molecular weight above about 5,000 and generally above about 500,000 and up to and including 10 million or more. An example of a polymer which is readily cleaved by the solution of this invention is a partially cleaved by the hydrolyzed high molecular weight polyacrylamide, marketed under the Pusher trade name by Dow Chemical Company. Aqueous solutions of these polymers have utility as viscosity enhancing and mobility control agents useful in displacing fluids in the secondary recovery of oil. Polymers are also useful components in drilling muds. They are especially advantageous as mobility control agents in an aqueous medium to displace fluids such as microemulsion, transparent emulsion, soluble oil, emulsion, or similar fluids. In most processes of this nature, the polyacrylamide solution is followed by a conventional water drive. Because of the nature of the polymer involved, many of the polymer molecules are absorbed or trapped in the pore openings of the formation surrounding the well bore with the result that water injection rates must be increased to maintain the same injectivity index.

For any constant injection rate, these polymer deposits will cause a large pressure drop to occur by the time the water drive enters the formation, thus limiting the rate at which water can be injected and the overall rate of recovering hydrocarbon.

It is necessary that the aqueous solution to be injected for increasing the permeability of the formation adjacent the well bore have basic characteristics, preferably having a pH greater than 8, more preferably greater than about 9, and most preferably having a pH greater than about 10.5 and less than about 13. As the pH of the solution decreases below about 8, its ability to cleave the polymer radically diminishes. The aqueous solution contains a compound of the formula MOX where M is an alkali metal or ammonium and X is a halogen. Preferred alkali metals include lithium, potassium, and most preferred, sodium. The halogens may be selected from fluorine, chlorine, bromine, or iodine, although if fluorine is utilized, care should be taken to use dilute solutions to prevent explosive fracturing of the formation. The most preferred halogen is chlorine. Examples of preferred permeability increasing compounds are potassium hypochlorite, sodium hypochlorite, potassium hypobromite, sodium hypobromite, ammonium hypochlorite, ammonium hypobromite, lithium hypobromite, lithium hypochlorite, and similar compounds. The compounds are added to water to form a solution having a pH greater than 8, and preferably greater than 10.5. In general, there will preferably be from 0.25 to about 10 and more preferably from about 1 to about 4 and most preferably from about 2 to about 4 percent by weight of the permeability increasing compound in the solution to be injected. The most preferred solution is made up of 3 percent by weight of sodium hypochlorite in water. It is preferred to inject from about 0.1 to 50 barrels of solution per vertical foot of oil-bearing sand to be treated, and more preferably, from 1 to 10 barrels per foot, although greater or lesser amounts may be injected depending on the nature of the formation or porous media. Commercially available solutions containing sodium hypochlorite and inert ingredients may be used advantageously.

If there is connate water in the vicinity of the well bore, more concentrated solutions of permeability increasing solution should be injected to insure that the resultant in situ solution has the required minimum pH of 8.

The aqueous formulation may contain various compatible additives as desired. Thus, it can be useful to add one or more of the following additives: corrosion inhibitors, antiemulsifying agents, sequestering agents, bactericides, and other additives or mixtures of additives, depending upon the conditions of the particular well and adjacent oil-bearing formation. It can also be quite useful to follow the injection of the basic permeability increasing solution with other standard well stimulation techniques. Therefore, it is often useful to acidize the well after polymer plugging has been reduced, to break up calcareous deposits. The acidic solution preferably contains from 0.1 to 35 and more preferably 1 to 20 percent by weight of a strong acid, preferably a mineral acid, e.g., sulfuric acid, hydrochloric acid. By a strong acid is meant one which has an ionization constant K greater than about $10^{-2}$. (See for instance "How Acids Behave in Solution", H. K. vanPoollen, Oil and Gas Journal, Sept. 25, 1967, p. 100). Weak acids, e.g., acetic, formic, having K values in the range of $10^{-5}$ to $10^{-2}$ are also useful, as well as in admixture with mineral acids. Hydrafrac processing ("Hydrafrac" is a registered trademark of the Pan American Petroleum Company) and other techniques may also be employed, depending on the well conditions and objectives of the well stimulation needed.

Although the mechanism of the permeability increase in accordance with this invention is not entirely understood, it is thought that the basic solution cleaves the polymer from the rock, reduces the molecular weight and viscosity of the plugging material, and, as a result, unplugs the pores of the formation to give greater permeabilities. As the pH of the solution is increased above 8, the solution becomes more effective.

The following examples illustrate preferred embodiments of this invention, such are not meant to limit the invention in any way. Example 1 was carried out in the laboratory and demonstrates the ability of sodium hypochlorite to reduce the plugging around a well bore due to deposited polymers from a polymer-based drilling mud. Example 3 shows how water injection rates may be increased by cleaning a formation of polymer by injection of a solution comprising sodium hypochlorite.

EXAMPLE 1

A 3 inch long by 1 inch in diameter Bradford core plug is cut using a carboxymethyl cellulose based drilling mud. An initial permeability test is run using water containing about 500 p.p.m. of dissolved solids and obtained from Bradford, Illinois (filtered through a 0.22 micron filter) to give a front section permeability of 63.0 millidarcies and a back section permeability of 65.0 millidarcies. The core is dried in a vacuum oven overnight. It is then soaked in 3 percent sodium hypochlorite solution having a pH of about 11.3 and under a vacuum for 24 hours. The same permeability test is run giving a front section permeability of 85.4 millidarcies and a back section permeability of 75.8 millidarcies. Thus, an increase in permeability in the front section of the core of about 35 percent is effected. For a constant water injection pressure, the injection rate is substantially increased after the sodium hypochlorite treatment.

EXAMPLE 2

The procedure used in example 1 is repeated except a dilute solution of sodium hypochlorite having a pH of about 7.5 is used. No appreciable increase in injection rate can be observed.

EXAMPLE 3

An injection well in the Henry reservoir of Crawford County, Illinois, has been subjected to an aqueous polymer (partially hydrolyzed, high molecular weight polyacrylamide) flood. Water injection is begun and after 1 month the injectivity is 0.157 barrels per day per pounds per square inch (BPD/p.s.i.). At this point, calcium carbonate impairment is believed o to be minimal. About 4 ½ months after water injection, the injectivity has decreased to 0.103 BPD/p.s.i. This decrease in injectivity is basically the result of permeability decrease due to polymer absorption around the well bore. All aqueous fluid injected into the well prior to aqueous polymer injection is softened to prevent scale deposition. The well is then stimulated with a 5 percent by weight hypochlorite solution followed by a 28 percent by weight hydrochloric acid slug, and the injectivity of the well increases to 0.178 BPD/p.s.i. Permeabilities surrounding the well bore are increased by this treatment.

It is understood that the invention is capable of a variety of modifications and variations which will be made apparent to those skilled in the art by a reading of the specification. Such modifications are intended to be included within the scope of the invention as defined in the specification and appended claims.

We claim:

1. A process of increasing the relative permeability to the flow of water of a subterranean formation having permeabilities within the immediate vicinity of a well bore "plugged" with a polymer solution, the process comprising contacting the formation with an aqueous solution having a pH greater than about 8 and less than about 13 and containing a compound or mixture of compounds of the formula MOX where M is an alkali metal or ammonium, and X is a halogen.

2. The process of claim 1 wherein the solution having a pH greater than 8 and less than about 13 comprises an alkali metal or ammonium hypochlorite.

3. The process of claim 1 wherein the solution having a pH greater than 8 and less than about 13 comprises sodium hypochlorite.

4. The process of claim 1 wherein injection of the solution having a pH greater than about 8 and less than about 13 is followed by injecting an aqueous solution containing an acid having an ionization constant greater than about $10^{-5}$.

5. The process of claim 4 wherein the acid has an ionization constant greater than about $10^{-2}$.

6. The process of claim 1 wherein the polymer comprises a partially hydrolyzed high molecular weight polyacrylamide.

7. The process of claim 6 wherein the compound identified by the formula MOX is sodium hypochlorite.

PO-1050
(5/69)

UNITED STATES PATENT OFFICE
CERTIFICATE OF CORRECTION

Patent No. 3,556,221        Dated January 19, 1971

Inventor(s) Gerald W. Haws et al

It is certified that error appears in the above-identified patent and that said Letters Patent are hereby corrected as shown below:

Col. 1, line 47:          Delete "cleaved by the"

Col. 3, line 30:          Delete --o-- and insert --to--.

Signed and sealed this 3rd day of August 1971.

(SEAL)
Attest:

EDWARD M. FLETCHER, JR.          WILLIAM E. SCHUYLER, JR.
Attesting Officer                  Commissioner of Patents